(12) United States Patent
Kemmerling et al.

(10) Patent No.: US 9,932,887 B2
(45) Date of Patent: Apr. 3, 2018

(54) EXHAUST GAS PASSAGE WITH AFTERTREATMENT SYSTEM

(71) Applicant: Ford Global Technologies, LLC, Dearborn, MI (US)

(72) Inventors: Joerg Kemmerling, Monschau (DE); Franz Arnd Sommerhoff, Aachen (DE); Andreas Kuske, Geulle (NL); Helmut Matthias Kindl, Aachen (DE); Vanco Smiljanovski, Bedburg (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 15/099,451

(22) Filed: Apr. 14, 2016

(65) Prior Publication Data

US 2016/0312689 A1    Oct. 27, 2016

(30) Foreign Application Priority Data

Apr. 24, 2015  (DE) ........................ 10 2015 207 573

(51) Int. Cl.
*F02D 23/00*  (2006.01)
*F01N 5/04*  (2006.01)
(Continued)

(52) U.S. Cl.
CPC ............ *F02B 37/22* (2013.01); *F01N 3/2006* (2013.01); *F02B 37/18* (2013.01); *F01N 3/0235* (2013.01); *Y02T 10/144* (2013.01); *Y02T 10/26* (2013.01)

(58) Field of Classification Search
CPC ........ F02B 37/22; F02B 37/18; F01N 3/2006; F01N 3/0235
(Continued)

(56) References Cited

U.S. PATENT DOCUMENTS 2,958,188 A * 11/1960 Leitner .................. F02K 1/386
60/264
3,027,143 A *  3/1962 Furgerson ................ F15D 1/06
138/39
(Continued)

FOREIGN PATENT DOCUMENTS

DE         2540882 A1 *  3/1977 ............. B01D 53/86
DE         3343284 A1 *  6/1985 ............... F01D 7/00
(Continued)

*Primary Examiner* — Thai Ba Trieu
(74) *Attorney, Agent, or Firm* — Julia Voutyras; McCoy Russell LLP

(57) ABSTRACT

Methods and systems are provided for adjusting flow of exhaust gas from downstream of an exhaust turbine outlet to an exhaust gas aftertreatment device inlet via a compact turbine outlet cone with adjustable swirl vanes. Exhaust flow reaching the exhaust gas aftertreatment device is adjusted based on a desired exhaust gas temperature and exhaust gas flow rate at the aftertreatment device. During cold start conditions, the swirl vanes may be closed to concentrate exhaust gas flowing towards a portion of the aftertreatment device while after attainment of aftertreatment device light-off temperature, the position of the swirl vanes may be adjusted to introduce turbulence and homogeneity to exhaust flow reaching the exhaust aftertreatment device.

20 Claims, 3 Drawing Sheets

(51) Int. Cl.
*F01N 3/10* (2006.01)
*F01N 1/00* (2006.01)
*F02B 37/22* (2006.01)
*F01N 3/20* (2006.01)
*F02B 37/18* (2006.01)
*F01N 3/023* (2006.01)

(58) Field of Classification Search
USPC .......................... 60/602, 280, 305, 322, 324
IPC ........................................................ F01N 3/28
See application file for complete search history.

(56) References Cited

U.S. PATENT DOCUMENTS

| | | | | |
|---|---|---|---|---|
| 3,964,875 A * | 6/1976 | Chang | .................... | F01N 3/2892 138/40 |
| 4,076,508 A * | 2/1978 | Christensen | .......... | B01D 50/00 60/311 |
| 4,183,896 A * | 1/1980 | Gordon | ..................... | F01N 3/02 60/303 |
| 4,601,168 A * | 7/1986 | Harris | ................... | F01N 3/2885 60/299 |
| 5,150,573 A * | 9/1992 | Maus | ..................... | F01N 3/281 60/299 |
| 5,296,202 A * | 3/1994 | Souers | ............... | B65G 69/0458 422/219 |
| 5,388,407 A * | 2/1995 | Capers | ..................... | F01N 3/20 60/324 |
| 5,571,484 A * | 11/1996 | Pettit | ..................... | F01N 3/2033 60/303 |
| 6,588,545 B1 * | 7/2003 | Lee | ........................... | F01N 3/02 181/264 |
| 6,745,562 B2 * | 6/2004 | Berriman | .............. | F01N 3/2892 60/324 |
| 7,028,663 B1 * | 4/2006 | Kim | ....................... | F01N 13/08 60/324 |
| 7,132,087 B2 * | 11/2006 | Craig | ................... | B01D 53/885 60/299 |
| 8,021,144 B2 * | 9/2011 | Vestin | ..................... | F23C 13/02 431/11 |
| 8,156,741 B2 * | 4/2012 | Talmon-Gros | ........ | F02B 37/225 60/605.1 |
| 8,615,984 B2 * | 12/2013 | Kornherr | ................ | F01N 3/2066 60/286 |
| 8,627,649 B2 * | 1/2014 | Peters | .................... | F01N 13/08 60/324 |
| 2012/0230814 A1 * | 9/2012 | Fledersbacher | ......... | F02B 37/24 415/159 |
| 2016/0245119 A1 * | 8/2016 | Wilkins | ................. | F01D 25/24 |
| 2016/0245157 A1 * | 8/2016 | Wilkins | ................. | F02B 37/18 |
| 2017/0107885 A1 * | 4/2017 | Tabata | ..................... | F01N 5/04 |
| 2017/0211449 A1 * | 7/2017 | Gockel | ................. | F01N 3/2821 |

FOREIGN PATENT DOCUMENTS

| | | | | |
|---|---|---|---|---|
| EP | 1493482 A2 * | 1/2005 | ........... | F01N 3/2066 |
| EP | 1507073 A1 * | 2/2005 | ........... | F01N 3/2892 |
| EP | 1514591 A1 * | 3/2005 | ............ | B01D 53/90 |
| EP | 1965060 A1 | 9/2008 | | |
| GB | 974016 A * | 11/1964 | ............ | F01D 25/32 |
| JP | H0754640 A | 2/1995 | | |
| JP | 2011111927 A * | 6/2011 | | |

\* cited by examiner

EXHAUST GAS PASSAGE WITH AFTERTREATMENT SYSTEM

CROSS-REFERENCE TO RELATED APPLICATION

This application claims priority to German Patent Application No. 102015207573.7, filed Apr. 24, 2015, the entire contents of which are hereby incorporated by reference for all purposes.

FIELD

The present description relates generally to system and methods for a turbine outlet cone with adjustable swirl vanes enabling a homogeneous flow distribution of exhaust gas upstream of an exhaust after treatment device.

BACKGROUND/SUMMARY

The disclosure relates to an internal combustion engine having an intake system for feeding in charge air, an exhaust-gas discharge system for discharging exhaust gas, and at least one combined exhaust-gas aftertreatment system, which is arranged in the exhaust-gas discharge system and has an intake housing for feeding in exhaust gas.

Within the context of the present disclosure, the expression internal combustion engine comprises diesel engines and spark-ignition engines, but also hybrid internal combustion engines, which use a hybrid combustion process, and hybrid drives, which comprise not only the internal combustion engine but also an electric machine which can be connected in terms of drive to the internal combustion engine and which receives power from the internal combustion engine or which, as a switchable auxiliary drive, additionally outputs power.

According to prior art, to reduce pollutant emissions, internal combustion engines are equipped with various exhaust gas aftertreatment systems. Even without additional measures, oxidation of the unburned hydrocarbons and of carbon monoxide duly takes place in the exhaust-gas discharge system at a sufficiently high temperature level and in the presence of sufficiently large oxygen quantities. However, on account of the exhaust gas temperature which falls quickly in the downstream direction, and the consequently rapidly decreasing rate of reaction, said reactions may be quickly halted. A possible lack of oxygen may be compensated by blowing in secondary air. However, special reactors and/or filters may need to be provided in the exhaust gas discharge system in order to noticeably reduce the pollutant emissions under all operating conditions.

Thermal reactors try to ensure a temperature level that is as high as possible by minimizing the heat losses by means of heat insulation, a sufficiently large reactor volume being intended to ensure a long dwell time of the exhaust gases. Both the long dwell time and the high temperature level assist the desired re-oxidation. The poor efficiency with sub stoichiometric combustion and the high costs may be disadvantageous. For diesel engines, thermal reactors are not effective on account of the temperature level always being lower than desired.

For the stated reasons, according to prior art, in spark-ignition engines use is made of catalytic reactors, which by using catalytic materials increase the rate of certain reactions and ensure an oxidation even at low temperatures. If nitrogen oxides are additionally to be reduced, this may be achieved by the use of a three-way catalytic converter, which however for this purpose requires stoichiometric operation (air fuel ratio $\lambda \approx 1$) of the spark-ignition engine within narrow limits. Here, the nitrogen oxides are reduced by means of the non-oxidized exhaust-gas components which are present, specifically the carbon monoxides, and the unburned hydrocarbons, wherein said exhaust-gas components are oxidized at the same time.

In internal combustion engines which are operated with an excess of air, that is to say for example spark-ignition engines operating in the lean-burn mode, but in particular direct-injection diesel engines or else direct-injection spark-ignition engines, the nitrogen oxides contained in the exhaust gas cannot be reduced in principle, owing to the lack of reducing agent. For the oxidation of the unburned hydrocarbons and of carbon monoxide, an oxidation catalytic converter is therefore provided in the exhaust-gas discharge system. To realize an adequate conversion, a certain operating temperature is required. The so-called light-off temperature may be 120° C. to 250° C.

To reduce the nitrogen oxides, use is made of selective catalytic converters (SCR) catalytic converters, wherein reducing agent is purposely introduced into the exhaust gas in order to selectively reduce the nitrogen oxides. As reducing agent, in addition to ammonia and urea, use may also be made of unburned hydrocarbons. The latter is also referred to as HC-enrichment. The unburned hydrocarbons may be introduced directly into the exhaust-gas discharge system or else may be fed in by means of engine-internal measures, specifically by means of a post-injection of additional fuel into the combustion chamber after the actual combustion. Here, the post-injected fuel should not be ignited in the combustion chamber by the main combustion that is still taking place or by the high combustion gas temperatures that exist even after the end of the main combustion, but rather should be introduced into the exhaust-gas discharge system during the charge exchange.

It is also possible to reduce the nitrogen oxide emissions by means of nitrogen oxide storage catalytic converters (LNT). Herein, the nitrogen oxides are initially (during a lean-burn mode of the internal combustion engine) absorbed, that is to say collected and stored, in the catalytic converter before being reduced during a regeneration phase, for example by means of sub stoichiometric operation ($\lambda < 1$) of the internal combustion engine with a lack of oxygen.

Further possible engine-internal measures for realizing rich, that is to say sub stoichiometric, operation of the internal combustion engine are exhaust-gas recirculation and, in the case of diesel engines, throttling in the intake system. It is possible to dispense with engine-internal measures if the reducing agent is introduced directly into the exhaust-gas discharge system, for example by injection of additional fuel. During the regeneration phase, the nitrogen oxides are released and converted substantially into nitrogen dioxide, carbon dioxide, and water. The frequency of the regeneration phases is determined by the overall emission of nitrogen oxides and the storage capacity of the LNT.

The temperature of the storage catalytic converter should preferably lie in a temperature window between 200° C. and 450° C., such that firstly a rapid reduction of the nitrogen oxides is ensured and secondly no desorption without conversion of the re-released nitrogen oxides takes place, such as may be triggered by excessively high temperatures.

The sulfur contained in the exhaust gas is likewise absorbed in the LNT and is regularly removed in the course of desulfurization. For this purpose, the LNT may be heated to high temperatures, usually of between 600° C. and 700° C., and supplied with a reducing agent, which in turn can be attained by the transition to rich operation of the internal combustion engine. The higher the temperature of the LNT, the more effectively the desulfurization proceeds, though an admissible maximum temperature must not be exceeded.

According to prior art, to minimize the emission of soot particles use is made of regenerative particle filters, which filter the soot particles out of the exhaust gas and store them. The accumulated soot particles may be burned off intermittently during the course of the regeneration of the filter. The high temperatures for the regeneration of the particle filter, of approximately 550° C. without catalytic assistance, may be reached during high engine loads and high engine speeds operations. It is therefore important to implement additional measures to ensure a regeneration of the filter under all operating conditions.

Since both the exhaust gases of spark-ignition engines and also the exhaust gases of diesel engines contain unburned hydrocarbons, carbon monoxide, nitrogen oxides and also soot particles (in different quantities and qualities), use is often made of combined exhaust-gas aftertreatment systems, which comprise one or more of the above-described catalytic converters, reactors and/or filters.

A combined exhaust-gas aftertreatment system may for example comprise a storage catalytic converter and a particle filter. The particle filter as a honeycomb filter then serves at the same time as a carrier substrate for forming the storage catalytic converter. Herein, the honeycomb filter is coated with a catalytic material that is suitable for storing and reducing the nitrogen oxides contained in the exhaust gas. Such a system is characterized by a compact design. Furthermore, a plurality of carrier substrates may be reduced since the carrier substrate of the particle filter is used at the same time to form the storage catalytic converter.

It is attempted to arrange exhaust-gas aftertreatment systems as close as possible to the outlet of the internal combustion engine, such as close to the outlet openings of the cylinders, in order to be able to make optimum use of the hot exhaust gas and ensure a rapid light-off of the exhaust-gas aftertreatment systems and a sufficiently high system temperature. The path of the hot exhaust gases to the various exhaust-gas aftertreatment systems should be as short as possible, such that the exhaust gases are given little time to cool down and the exhaust-gas aftertreatment systems reach their operating temperature or light-off temperature as quickly as possible, in particular after a cold-start of the internal combustion engine.

It is therefore always sought to minimize the thermal inertia of the part of the exhaust-gas discharge system between the outlet opening at the cylinder and the exhaust-gas aftertreatment system, which can be achieved by reducing the mass and the length of said part.

For the reasons stated above, the exhaust manifold is frequently integrated into the cylinder head. The integration of the exhaust manifold additionally permits dense packaging of the drive unit. Furthermore, the exhaust manifold can benefit from a liquid-type cooling arrangement that may be provided in the cylinder head, such that the manifold does not need to be manufactured from expensive materials that can be subject to high thermal load.

Further measures are required to realize the temperatures necessary for an efficient exhaust-gas aftertreatment reliably and according to requirements, for example after a cold-start. Also, further measures are required to ensure or promote dense packaging of the exhaust-gas discharge system together with the exhaust-gas aftertreatment system, and consequently of the entire drive unit.

The inventors herein have recognized the above issues and identified an approach by which the issues described above may be at least partly addressed. In one example, a method comprises: during cold start conditions, closing a plurality of vanes coupled to an exhaust turbine outlet cone to concentrate exhaust flowing towards a portion of an exhaust aftertreatment device, and after attainment of exhaust aftertreatment device light-off temperature, adjusting an orientation of the plurality of vanes to introduce turbulence and homogeneity to exhaust flow reaching the exhaust aftertreatment device.

The object of the present disclosure is to provide an internal combustion engine in which the high temperatures required for an efficient exhaust-gas aftertreatment can be realized more quickly, in particular after a cold-start, and which has a dense packaging of the exhaust-gas discharge system together with the exhaust-gas aftertreatment.

Said object is achieved by means of an internal combustion engine comprising an intake system for feeding in charge air, an exhaust-gas discharge system for discharging exhaust gas, and at least one combined exhaust-gas aftertreatment system, which is arranged in the exhaust-gas discharge system and has an intake housing for feeding in exhaust gas. The housing comprises an adjustable ring-shaped guide device that leaves an opening free in the middle and comprises guide vanes that can be rotated by means of an adjusting device arranged in the intake housing. Each of the guide vanes is arranged on a guide vane specific shaft. A wall may be involved in forming the intake housing and bounding it on the outside enclosing the ring-shaped guide device while forming a gap between the guide vanes and the wall in the manner of a frame. In a closing position, the adjustable ring-shaped guide device may cover an annular segment of a deployable inlet flow cross section in the manner of a shutter.

In the case of the internal combustion engine according to the disclosure, the at least one exhaust-gas aftertreatment system is equipped with an adjustable ring-shaped guide device, which is arranged in the intake housing of the exhaust-gas aftertreatment and with which the exhaust-gas flow can be influenced in various ways before entering the exhaust-gas aftertreatment system.

For example, turbulences, such as vortexes, can be introduced into the exhaust-gas flow by means of the guide device. The exhaust-gas flow may also be deflected, in particular widened. This allows a uniform flow through the exhaust-gas aftertreatment system and its carrier substrate to be realized or ensured. While according to prior art the flow rate may vary more locally, such as not every region of the carrier substrate is flowed through by the same amount of exhaust gas, according to the disclosure, the exhaust gas to be after-treated is distributed uniformly or more uniformly over the entire exhaust-gas aftertreatment system. The local flow rates are equalized or evened out, for which reason the amounts of exhaust gas flowing through the exhaust-gas aftertreatment system do not vary locally as much or at all. The effects described above have a number of advantages at the same time.

On the one hand, the intake housing, which regularly widens in the direction of the exhaust-gas aftertreatment system, can be made comparatively short, and the exhaust-gas aftertreatment system can be advantageously arranged close to the engine.

On the other hand, the exhaust-gas aftertreatment system that is present is used in its entirety, and consequently more effectively, and it is not the case that some regions, in particular centrally arranged regions, are used more intensively than other regions, for example outer peripheral regions. To this extent, the exhaust-gas aftertreatment system as such can be made more compact, such as with a smaller volume, whereby the costs for the exhaust-gas aftertreatment system may also be reduced.

The provision according to the disclosure of a guide device consequently allows a dense packaging of the exhaust-gas discharge system together with the exhaust-gas aftertreatment system, and consequently a dense packaging of the drive unit as a whole.

In addition, the ring-shaped guide device can be adjusted and transferred into a closing position, in which the guide vanes of the guide device cover an annular segment of the flow cross section in the inlet region of the exhaust-gas aftertreatment in the manner of a shutter.

Then an opening through which the entire exhaust gas is conducted remains centrally in the closed position of the guide device. Transferring the guide device into the closed position has the effect of constricting the exhaust-gas flow and concentrating the entire exhaust gas flow to be aftertreated to a locally confined region of the exhaust gas aftertreatment system. Such a concentration of the exhaust gas flow proves to be advantageous to maintain the temperature of the exhaust-gas aftertreatment system even with small amounts of exhaust gas. In particular, the local heating up of the exhaust-gas aftertreatment system after a cold-start may be brought about by enforced constriction or concentration of the exhaust-gas flow.

The internal combustion engine according to the disclosure is an internal combustion engine in which the high temperatures required for an efficient exhaust gas aftertreatment can be realized more quickly, in particular after a cold-start, and which has a dense packaging of the exhaust-gas discharge system together with the exhaust gas aftertreatment.

According to the disclosure, the guide device may have multiple rotatable guide vanes. The adjusting device may have a rotatable adjusting ring, wherein the guide vanes are adjustable by means of turning the adjusting ring.

The adjusting device has a rotatable adjusting ring, which is preferably mounted coaxially in relation to the intake housing. The guide vanes are kinematically coupled to the adjusting ring via intermediate elements, such that the guide vanes can be adjusted by turning of the ring. Pivotable levers may be provided as intermediate elements for the kinematic coupling of the adjusting ring to the guide vane specific shafts.

The levers may be respectively connected at their one end, on the shaft side, in a rotationally conjoint manner to a guide vane specific shaft and are mounted at their other end, on the ring side, movably in a recess of the adjusting ring, such that the guide vanes are adjustable by means of turning the adjusting ring. The levers may be directed inwardly from the adjusting ring, the adjusting ring is with respect to the levers an outer adjusting ring, which leads to a greater diameter of the adjusting ring. The pivotable levers may, however, also be directed outwardly from the adjusting ring. In an alternate embodiment, the adjusting ring then forms with respect to the levers an inner adjusting ring, which is characterized by a comparatively small diameter. In comparison with an outer adjusting ring, an inner adjusting ring leads to a more compact exhaust-gas aftertreatment system.

At least one turbine may be arranged in the exhaust-gas discharge system, preferably upstream of the at least one exhaust gas aftertreatment system. It may be advantageous to be able to use the enthalpy of the hot exhaust gases optimally and ensure a rapid response behavior of the turbine. At least one turbine may be a turbine of an exhaust-gas turbocharger which comprises a turbine arranged in the exhaust-gas discharge system and a compressor arranged in the intake system are advantageous.

Supercharging is primarily a method for increasing performance in which the air required for the combustion process in the engine is compressed, as a result of which a greater air mass can be fed to each cylinder in each working cycle. In this way, the fuel mass and therefore the mean pressure can be increased. For supercharging, use is preferably made of an exhaust-gas turbocharger, in which a compressor and a turbine are arranged on the same shaft. The hot exhaust-gas flow is fed to the turbine which expands in the turbine with a release of energy, as a result of which the shaft is set in rotation. The energy supplied by the exhaust-gas flow to the turbine and ultimately to the shaft is used for driving the compressor which is likewise arranged on the shaft. The compressor supplies and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. In this way, compression by cooling takes place.

The advantage of an exhaust-gas turbocharger in comparison with a mechanical charger is that no mechanical connection for transmitting power exists or is required between the charger and the internal combustion engine. While a mechanical charger extracts the energy required for driving it entirely from the internal combustion engine, it thereby reduces the output power and consequently adversely affects the efficiency, the exhaust-gas turbocharger utilizes the exhaust-gas energy of the hot exhaust gases.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible to shift the load collective toward higher loads, at which the specific fuel consumption is lower. By means of supercharging in combination with suitable transmission configurations, it is also possible to realize so-called downspeeding, with which it is likewise possible to achieve a lower specific fuel consumption.

Supercharging consequently assists in the constant efforts in the development of internal combustion engines to minimize fuel consumption that is to say to improve the efficiency of the internal combustion engine.

It is a further basic aim to reduce pollutant emissions. Supercharging can likewise be expedient in solving this issue. With targeted configuration of the supercharging, it is possible specifically to obtain advantages with regard to efficiency and with regard to exhaust-gas emissions.

The torque characteristic of a supercharged internal combustion engine may be improved by using multiple turbochargers, for example by multiple turbines of relatively small turbine cross section arranged in parallel (in a way similar to a sequential supercharging arrangement), wherein, with increasing exhaust-gas flow rate, turbines are activated successively. The torque characteristic of a supercharged internal combustion engine may also be improved by means of multiple series-connected exhaust-gas turbochargers, of which one exhaust-gas turbocharger serves as a high-pressure stage and one exhaust-gas turbocharger serves as a low-pressure stage.

Embodiments of an internal combustion engine in which at least two exhaust-gas turbochargers are provided, each comprising a turbine arranged in the exhaust-gas discharge system and a compressor arranged in the intake system, may therefore also be advantageous for the reasons stated above.

Embodiments of the internal combustion engine in which the intake housing is widened in the direction of flow to the at least one exhaust-gas aftertreatment system may be advantageous. This assists a widening of the exhaust-gas flow in the inlet region of the exhaust-gas aftertreatment system and is conducive to uniform impingement of the entire exhaust-gas aftertreatment system with exhaust gas Embodiments of the internal combustion engine in which the intake housing is of a funnel-shaped form may be advantageous in this connection. A funnel shape provides a continuous widening of the intake housing and a continuous widening of the exhaust gas flow with as little pressure loss as possible in the exhaust-gas flow. Also, the intake housing may be of frustoconical form.

A sleeve arranged in the intake housing may be provided. The sleeve maybe aligned coaxially in relation to the intake housing and may pass through the central opening in the ring-shaped guide device. The sleeve may be widened in the direction of flow toward the at least one exhaust gas aftertreatment system. The sleeve may be one of a conical form or a frustoconical form. In addition, a holding device may be provided for the sleeve.

Each guide vane specific shaft may be of rectilinear form. A rectilinear form of the shaft simplifies the kinematics of the adjusting device in such a way that the turning of the guide vane specific shaft at the end on the adjusting ring side brings about a purely rotational movement of the associated guide vane, whereas a cranked shaft would cause a tumbling movement of the guide vane, which makes it more difficult for the rotatable guide vanes to be arranged in the intake housing with almost no gap and makes it difficult for the guide vanes to be arranged in multiple different turning positions with almost no gap.

In the present case, the vanes perform a purely rotational movement when the ring turns. As a result, an almost gapless arrangement of the rotatable guide vanes in the intake housing is possible, specifically in every turning position of the vanes. The latter is a significant advantage in comparison with cranked shafts, since it is intended that the exhaust-gas flow should be conducted across the guide vanes, and not via a gap past the guide vanes.

An actuating device may be used for the turning of the adjusting ring, wherein the actuating device may be both an electrical actuating device and a mechanical actuating device. A mounting may be provided for the adjusting ring, for example in the form of a rolling bearing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
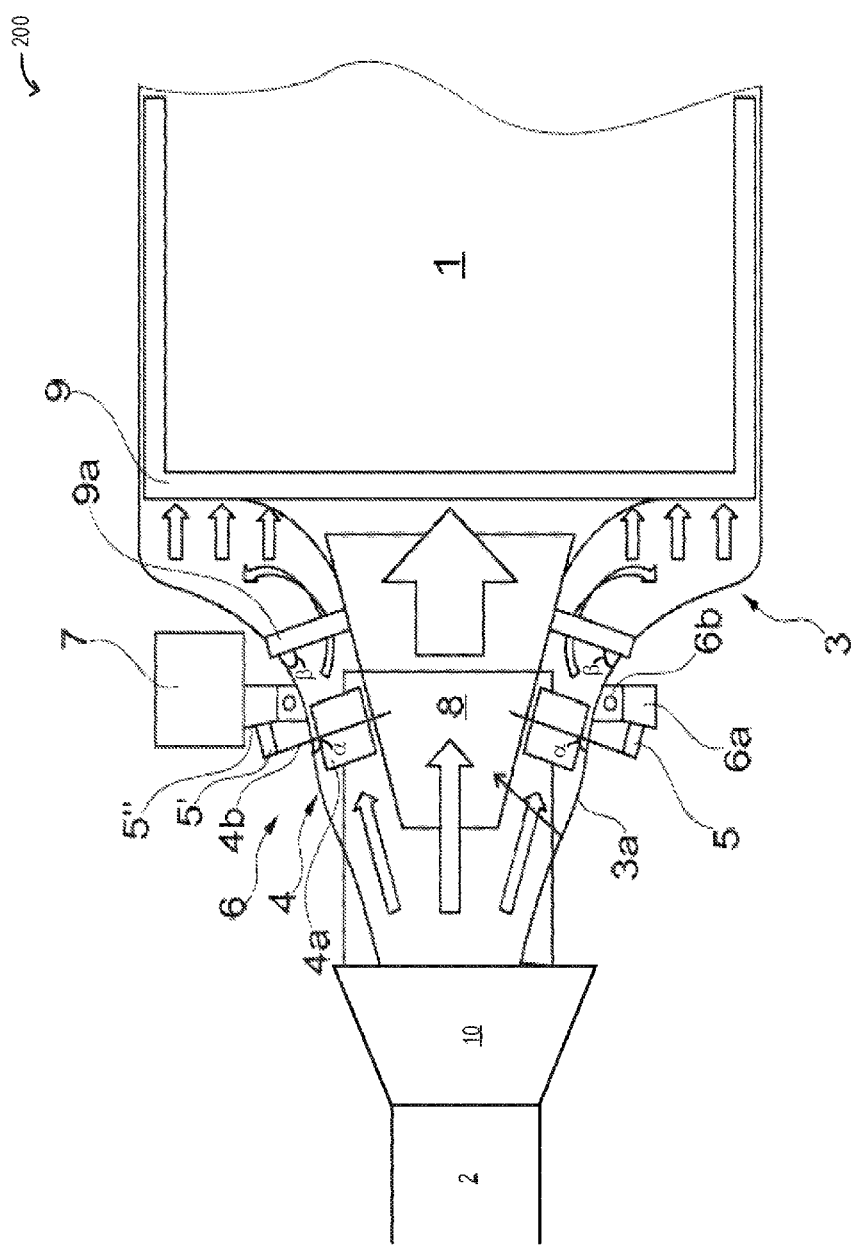
FIG. 2 shows an example embodiment of the turbine outlet cone of FIG. 1.

The following description relates to systems and methods for improving exhaust gas flow from the outlet of an exhaust turbine to an exhaust aftertreatment device via a turbine outlet cone. A longitudinal cross-section of an example engine system comprising a turbine outlet cone with adjustable swirl vanes is shown in FIG. 2. An engine controller may be configured to perform a control routine, such as the example routine of FIG. 3, to vary the position (orientation) of the adjustable swirl vanes to optimize the exhaust flow to the aftertreatment device, based on engine operating conditions.

Figure 1:
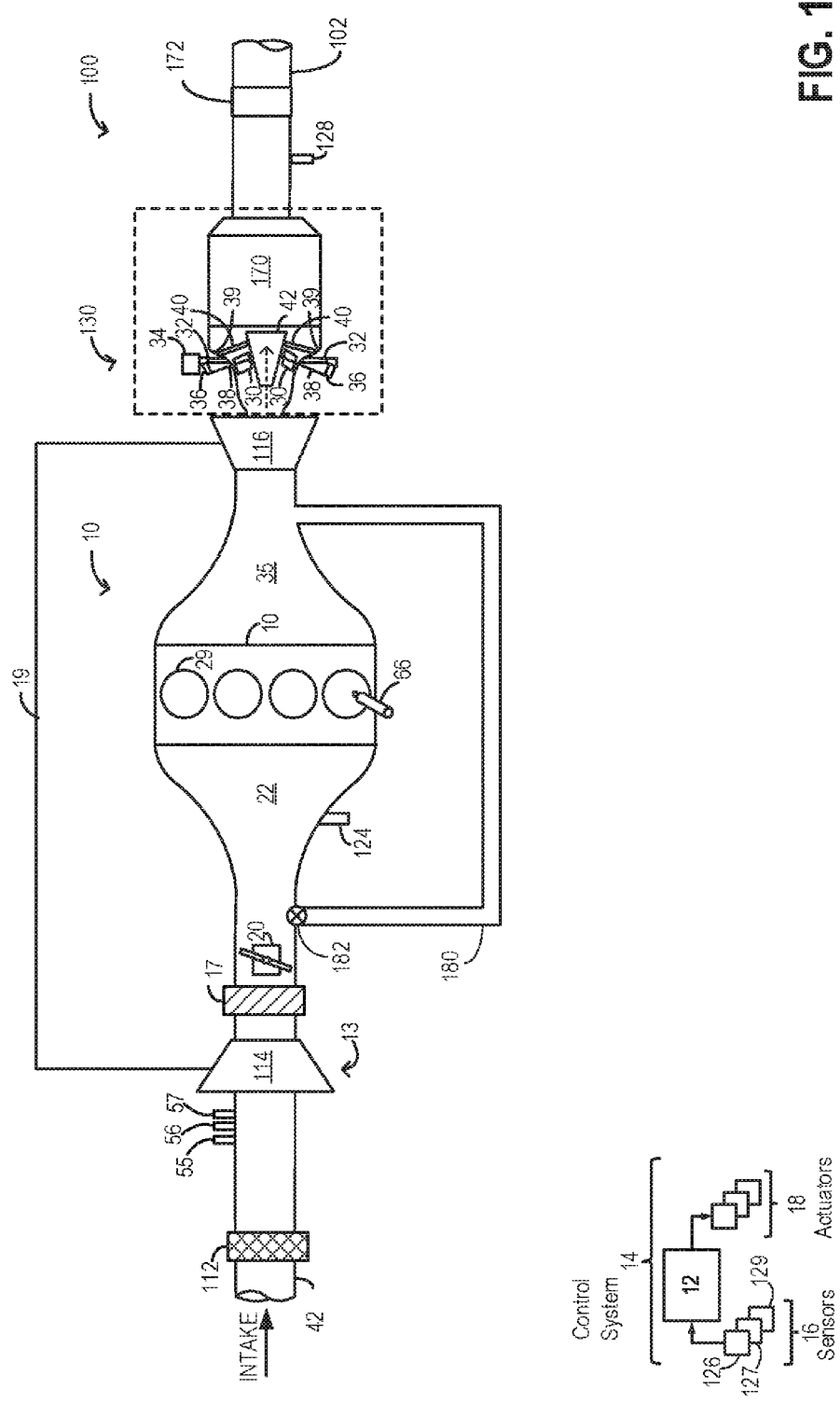
FIG. 1 shows an example embodiment of an engine system including a turbine outlet cone and an exhaust gas aftertreatment device.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator (not shown) may be actuated open to dump at least some exhaust pressure from upstream of the turbine to a location downstream of the turbine via wastegate. By reducing exhaust pressure upstream of the turbine, turbine speed can be reduced, which in turn helps to reduce compressor surge.

Intake manifold 22 is coupled to a series of combustion chambers 29 through a series of intake valves (not shown). The combustion chambers are further coupled to exhaust manifold 35 via a series of exhaust valves (not shown). In the depicted embodiment, a single exhaust manifold 35 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 29 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device (exhaust aftertreatment device) 170 via the turbine outlet cone 130 comprising adjustable swirl vanes 30. The turbine outlet cone may be funnel-shaped, with a tapering end proximal to the turbine and a widening end proximal to the exhaust aftertreatment device 170. The turbine outlet cone may further comprise an adjustable guide device with which the flow of exhaust into the aftertreatment device 170 may be adjusted. The adjustable guide device includes an adjusting ring 32 which may be actuated by the controller via an actuator 34 coupled to the ring 32. The ring may be adjusted to move the position of the swirl vanes 30. A plurality of swirl vanes 30 may be coupled to the adjusting ring via vane specific shafts 38 and levers 36, such that the vanes 30 may be adjusted by turning the ring 32. The vanes 30 may perform a rotational movement about the shaft 38 (which acts as an axis of rotation) upon turning the ring. By adjusting the position of the vanes 30, flow of exhaust from the turbine outlet to the aftertreatment device may be controlled. For example, turbulences, such as vortexes, may be introduced into the exhaust gas flow by means of adjustments to the position of the vanes 30. This ensures a uniform distribution of exhaust flow over the entire exhaust aftertreatment system 170. In one example, the guide ring 32 may be adjusted to completely close the vanes which will constrict the exhaust flow and concentrate the entire volume of exhaust towards a certain region of the aftertreatment device. During conditions such as cold-start, a concentration of the exhaust gas flow (concentrated exhaust energy) may be advantageous to maintain and/or increase the temperature of the exhaust aftertreatment device 170 even with small amounts of exhaust gas (low exhaust mass flow).

A sleeve 39 may be used to couple the turbine outlet cone 130 to the exhaust aftertreatment device 170 wherein the sleeve 39 may be one of a conical form or a frustoconical form. A holding device 40 may be utilized for supporting the sleeve. In this way, a closely-packed (dense) arrangement of the turbine outlet cone and the exhaust aftertreatment device provides optimal exhaust flow into the aftertreatment device while decreasing packaging concerns. A detailed description of the turbine outlet cone 130 is discussed in relation to FIG. 2.

In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust aftertreatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. The treated exhaust from emission control 170 may be released into the atmosphere via main exhaust passage 102 after passing through a muffler 172.

Engine system 10 may be adapted to provide external, low-pressure exhaust gas recirculation (LP-EGR) by flowing exhaust gas from downstream of turbine 116, and delivering it to the engine intake passage 42 upstream of compressor 114 via an LP-EGR passage 19. An EGR valve may be coupled to the LP-EGR passage to adjust EGR flow rate. The engine system may also include a high pressure EGR (HP-EGR) flow path wherein exhaust gas is drawn from upstream of turbine 116 and recirculated to the engine intake manifold 22, downstream of compressor 114, via an HP-EGR passage 180. Also, an EGR valve 182 may be coupled to the HP-EGR passage 180 to control EGR flow rate.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and an oxygen sensor 57 coupled to the compressor inlet. In one example, an air-fuel ratio sensor is an oxygen sensor 57.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor which may be an oxygen sensor 57, and EGR sensor 127. Other sensors such as additional pressure, temperature, air/fuel ratio, and composition sensors may be coupled to various locations in engine system 100. The actuators 81 may include, for example, throttle 20, EGR valve 182, fuel injector 66, and adjustable ring actuator 34. The control system 14 may include a controller 12. The controller 12 may receive input data from the various sensors, process the input data, and trigger various actuators in response to the processed input data based on instruction or code programmed therein corresponding to one or more routines. For example, based on engine operating conditions, and temperature of exhaust aftertreatment device 170, the actuator 34 coupled to the ring 32 may be adjusted to change the orientation of the swirl vanes 30. An example control routine is described with regard to FIG. 3.

FIG. 2 schematically shows an example embodiment 200 of an engine turbine outlet cone 3 along with a combined exhaust-gas aftertreatment system 1, arranged in the exhaust-gas discharge system, of an internal combustion engine. In one example, the turbine outlet cone 3 is the turbine outlet cone as seen in FIG. 1. In order to discharge hot exhaust gas from the cylinders, the internal combustion engine has an exhaust-gas discharge system with an exhaust passage 2. At least one exhaust-gas turbocharger is provided for supercharging the cylinders. The turbocharger comprises a turbine 10 that is arranged upstream of the combined exhaust-gas aftertreatment system 1 in the exhaust-gas passage 2.

The exhaust passage 2 may form a turbine outlet cone 3 downstream of the turbine 10 and upstream of the combined exhaust-gas aftertreatment system 1. The turbine outlet cone 3 may be funnel-shaped for facilitating feeding of exhaust gas to the aftertreatment device 1. The turbine outlet cone 3 widens in the direction of flow toward the exhaust-gas aftertreatment system 1, whereby the exhaust gas flow is widened in the inlet region of the device 1.

A wall 3a of the turbine outlet cone 3 encloses an adjustable guide device 4 for adjusting flow of exhaust from the turbine 10 to the aftertreatment device 1. The guide device 4 may provide an unobstructed region 8 towards the center of the turbine outlet cone 3. The unobstructed region 8 forms an inner expansion cone for expansion of the exhaust passing through it. A frustoconically formed sleeve 9 may be aligned coaxially in relation to the turbine outlet cone 3. The sleeve may be used to connect the wider end of the turbine outlet cone 3 to the aftertreatment device 1. The sleeve 9 may be in held in a fixed position within the turbine outlet cone 3 by means of a pair of holding devices 9a. A first holding device in the form of a rod may be positioned in the top part of the cone 3, between the upper part of a first end of the sleeve 9 proximal to the cone 3 and the top portion of the wall 3a. Similarly, a second holing device in the form of a rod may be positioned in the bottom part of the cone 3, between the lower part of the first end of the sleeve 9 proximal to the cone 3 and the bottom portion of the wall 3a. Each of the first and the second holding devices may form an angle β to the wall 3a. In one example the angle β may be a right (90°) angle. The holding devices 9a provide structural integrity supporting the sleeve 9 connecting the cone 3 to the aftertreatment device 1.

The adjustable guide device 4 comprises a plurality of guide vanes 4a that can be turned by means of an adjusting device 6. Each guide vane of the plurality of guide vanes 4a is arranged along the inner surface of the wall 3a (along the circumference of the cone 3), on a rectilinear guide vane specific shaft 4b. In one example, the vanes may be rectangular in shape with a flat surface. In another example, the vanes may be curved surface. Each of vanes may be of similar or different dimensions. A guide vane specific shaft coupled to each guide vane may be coupled along the central portion of the vane. The shaft 4b forms an axis about which the vane is free to rotate 360°. Each of the shafts may form an angle a with respect to the wall 3a. In one example the angle α may be a right (90°) angle.

A gap may be allowed between the guide vanes 4a and the inner surface of the wall 3a, in order to allow a rotational movement of the guide vanes 4a about an axis (shaft 4b).

The adjusting device 6 may further comprise a rotatable adjusting ring 6a. The adjusting ring 6a may form a concentric circle around the wall 3a. Pivotable levers 5 may be provided as intermediate elements for the kinematic coupling of the adjusting ring 6a to the guide vane specific shafts 4b, such that the guide vanes 4a are adjustable by means of turning (rotating) the adjusting ring 6a. For this purpose, the levers 5 may be respectively connected at their shaft-side end 5' in a rotationally conjoint manner to the guide vane specific shaft 4b and may be mounted at their ring-side end 5" movably in a recess of the adjusting ring 6a. A set of levers 5 connect a part of the adjusting ring 6a to an individual vane 4a via the shaft 4b corresponding to the respective vane 4a. Each vain 4a is connected to a different part of the adjusting ring 6a along the inner circumference of the ring 6a.

The mounting 6b of the adjusting ring 6a on to the outer surface of the wall 3a may be undertaken by means of an inner rolling bearing. An electrical actuating device 7 coupled to the adjusting ring 6a may be utilized for turning the adjusting ring 6a as and when required. The actuator 7 may be a part of the control system as described in relation to FIG. 1.

By adjusting the position (orientation) of the vanes 4a, it is possible to adjust swirl flow upstream of the aftertreatment device 1 enabling homogeneous flow distribution within a short flow distance, thereby enabling compact packaging of the associated components. The orientation of the vanes 4a may be defined as the angle between the plane of the vane surface and its axis (shaft 4b). By adjusting the ring 6a, the vanes may be completely opened wherein minimal surface area of the vanes obstruct the flow of exhaust via the region (opening) 8. In this position, an ideal expansion cone may be provided for expansion of the exhaust while pressure losses between the turbine outlet and the inlet section of the aftertreatment device may be reduced. In another example, the ring 6a may be adjusted such that the guide vanes 4a may be actuated to cover an annular segment of the flow cross section (opening 8) in the turbine outlet cone 3 in the manner of a shutter. The vanes may be actuated to a fully closed position during low exhaust flow rates and/or during conditions (such as cold-start) when accelerated heating of the aftertreatment device is desired. In this position, concentrated exhaust may be channeled to flow to a portion of the aftertreatment device 1 which may facilitate accelerated light-off and/or maintenance of a desired temperature within the specific portion of the device 1.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3:
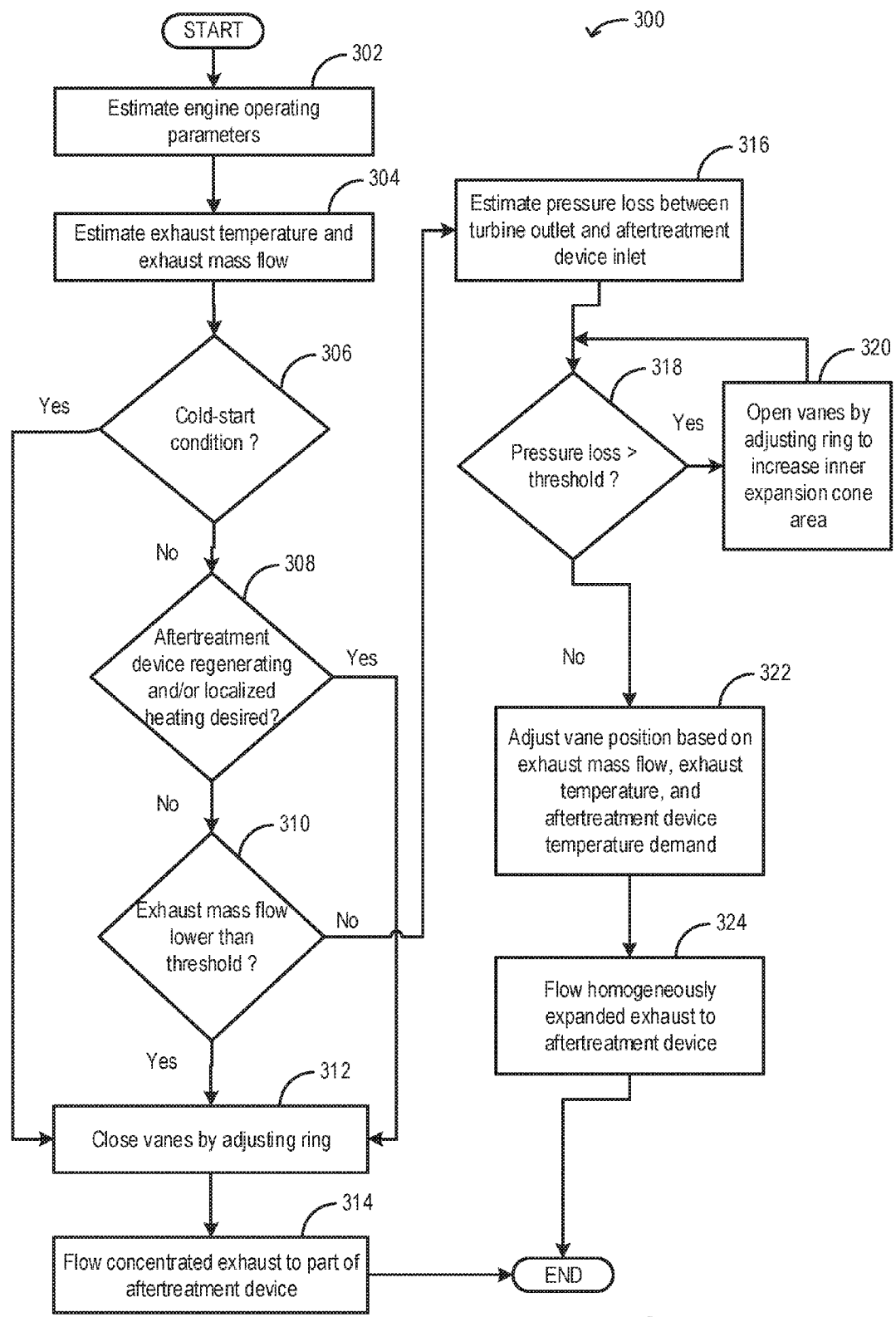
FIG. 3 shows a flow chart illustrating an example method that may be implemented for adjusting the swirl vanes of the turbine outlet cone based on engine operating conditions.

FIG. 3 illustrates an example method 300 that may be implemented for adjusting the vanes of the swirl vanes of the turbine outlet cone of FIG. 2 based on engine operating conditions and temperature requirement of an exhaust aftertreatment device. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

In 302, the routine includes estimating and/or measuring current engine operating conditions. Conditions assessed may include, for example, engine temperature, engine load, engine speed, manifold vacuum, throttle position, exhaust pressure, exhaust air/fuel ratio, etc. At 304, based on the estimated engine operating conditions and input from exhaust sensors, exhaust temperature, and exhaust mass flow may be estimated. Exhaust temperature and exhaust mass flow may vary based on one or more of engine temperature, engine speed, and engine load. In one example, exhaust temperature may be low during engine operations at low temperature and/or low load. In another example exhaust mass flow may be low during engine operations at low load and/or low speed.

At 306, the routine includes determining if the vehicle engine is operating under cold-start conditions. An engine cold-start condition may be confirmed when the engine is started after a prolonged period of engine inactivity, or when the engine temperature is lower than a threshold such as below an exhaust after treatment device (such as device 1 in FIG. 2) light-off temperature. Also, cold-start conditions may prevail when ambient temperatures are below a threshold. If it is determined that cold-start conditions are not present, at 308, the routine includes determining if the exhaust aftertreatment device is regenerating or if there is an upcoming regeneration event. The controller may also determine if due to regeneration, or any other purpose, localized heating of a certain portion of the exhaust aftertreatment device is desired. Localized heating may be desired to maintain a high temperature at a certain active part of the exhaust aftertreatment device. If it is determined that based on current exhaust aftertreatment device operation, localized heating is not desired, at 310, the routine includes determining if exhaust mass flow is lower than a threshold mass flow. Exhaust mass flow may be lower than the threshold mass flow during low engine speed and/or load conditions.

If (at 306) it is determined that cold-start condition is present, the routine moves on to step 312. Also (at 308), if it is determined that the exhaust aftertreatment device is regenerating (or an upcoming regeneration is scheduled) and/or localized heating is desired, the routine moves to step 312. Further (at 310), upon determination that exhaust mass flow is lower than the threshold mass flow the routine may proceed to step 312. At 312, the controller may send a signal to an actuator coupled to the adjusting ring (such as ring 6a in FIG. 2) to close the vanes by adjusting the ring. When the vanes are in closed position, the surface area of the vanes may obstruct a part of the turbine outlet cone thereby concentrating the exhaust mass flow exiting the turbine. At 314, the concentrated exhaust flow may be guided towards a certain part of the catalyst. Due to the concentration of exhaust energy to a smaller area, light-off temperature of the aftertreatment device may be attained within a shorter duration. Also, by channeling the exhaust energy, during low exhaust mass flow, cooling down of the aftertreatment device may be reduced.

If at 310 it is determined that exhaust mass flow is higher than the threshold mass flow, at 316, pressure loss between the turbine outlet and an inlet of the aftertreatment device may be estimated based on input from one or more exhaust gas sensors such as an exhaust pressure sensor coupled to the exhaust passage. At 318, the routine includes determining if the pressure loss is higher than a threshold pressure loss. The threshold pressure loss may correspond to the maximum permissible pressure loss between the two exhaust components in order to maintain optimum functioning of the aftertreatment device.

If it is determined that the pressure loss is higher than the threshold, at 320, the controller may send a signal to the actuator coupled to the adjusting ring to completely open the vanes by adjusting the ring. In the completely (maximum possible) open position, the vanes are oriented in a way to provide minimum obstruction to the flow of exhaust via the turbine outlet cone. The exhaust may get expanded and turbulence may be introduced in the exhaust flow reaching the aftertreatment device which may in turn reduce the pressure loss. The vanes may be maintained in completely open position until the pressure loss reduces below the threshold.

If it is determined that the pressure loss is lower than the threshold, at 322, the actuator coupled to the adjusting ring may adjust the position of the vanes based on exhaust mass flow, exhaust temperature, and aftertreatment device temperature demand. By adjusting the position of the vanes, a swirl motion (turbulences, such as vortexes) may be controlled in the exhaust flow which facilitates in making the exhaust flow upstream of the aftertreatment device homogeneous. In this way, at 324, homogeneously expanded exhaust may be delivered to the inlet of the exhaust aftertreatment device.

One example method comprises, during cold start conditions, closing a plurality of vanes coupled to an exhaust turbine outlet cone to concentrate exhaust flowing towards a portion of an exhaust aftertreatment device, and after attainment of exhaust aftertreatment device light-off temperature, adjusting an orientation of the plurality of vanes to introduce turbulence and homogeneity to exhaust flow reaching the exhaust aftertreatment device. In the preceding example, additionally or optionally, closing the plurality of vanes and adjusting the orientation of the plurality of vanes include adjusting a ring coupled to each vane of the plurality of vanes via a plurality of shafts and levers, wherein a shaft forms an axis about which a vane can rotate. In any or all of the preceding examples, additionally or optionally, the ring is coupled to an outer surface of a wall enclosing the turbine outlet cone via a mounting device and an actuator is coupled to the ring to adjust the ring. In any or all of the preceding examples, additionally or optionally, adjusting the orientation of the plurality of vanes is based on exhaust mass flow, exhaust temperature, temperature demand of exhaust aftertreatment device. Any or all of the preceding examples further comprises, additionally or optionally, closing the plurality of vanes to flow a concentrated exhaust mass towards the portion of the exhaust aftertreatment device during a lower than threshold exhaust flow rate. Any or all of the preceding examples further comprises, additionally or optionally, opening the plurality of vanes to a maximum possible degree based on a higher than threshold pressure loss between a turbine and the exhaust aftertreatment device.

Another example engine system comprises an exhaust gas passage for discharging exhaust gas, a turbine coupled to the exhaust gas passage, at least one combined exhaust gas aftertreatment system coupled to the exhaust gas passage downstream of the turbine, and a housing coupling the turbine to the exhaust gas aftertreatment system, and a controller with computer readable instructions stored on non-transitory memory for: adjusting flow of exhaust from downstream of the turbine to an inlet of the exhaust aftertreatment system; wherein the housing includes an adjustable guide device forming an opening in a middle portion of the housing and the adjustable guide device comprises a plurality of guide vanes that can be rotated by means of an adjusting device arranged in the housing. The preceding example further comprises, additionally or optionally, a wall enclosing the housing and the guide device while forming a gap between each guide vane of the plurality of vanes and the wall. In any or all of the preceding examples, additionally or optionally, each guide vane is arranged on a guide vane specific shaft, each guide vane is rotatable about the guide vane specific shaft. In any or all of the preceding examples, additionally or optionally, each of the guide vane specific shaft is of rectilinear shape and forms an angle with the wall, wherein the angle is 90°. In any or all of the preceding examples, additionally or optionally, the adjusting device comprises a rotatable adjusting ring capable of adjusting the plurality of guide vanes via rotation of the adjusting ring, and an actuator to adjust the rotation of the adjusting ring. In any or all of the preceding examples, additionally or optionally, the rotatable adjusting ring is kinematically coupled to each of the guide vane specific shaft via pivotable levers. In any or all of the preceding examples, additionally or optionally, the pivotable levers are respectively connected at their one end, on the shaft side, in a rotationally conjoint manner to a guide vane specific shaft and are mounted at their other end, on the ring side, movably in a recess of the adjusting ring, enabling adjustments to the guide vanes via rotation of the adjusting ring. In any or all of the preceding examples, additionally or optionally, the housing is one of a funnel-shaped form and a frustoconical form with a first end of the housing proximal to the turbine narrower than a second end of the housing proximal to the exhaust gas aftertreatment system, the exhaust gas aftertreatment system is one or more of a NOx trap, an exhaust catalyst, and a particulate filter. Any or all of the preceding examples further comprises, additionally or optionally, a sleeve arranged in the housing aligned coaxially in relation to the housing and passing through a central opening in the adjustable guide device, wherein the sleeve is one of a funnel-shaped form and a frustoconical form with a first end of the sleeve proximal to the turbine narrower compared to a second end of the sleeve proximal to the exhaust gas aftertreatment system. In any or all of the preceding examples, additionally or optionally, the sleeve is coupled to the wall of the housing via a plurality of holding devices. In any or all of the preceding examples, additionally or optionally, the plurality of holding devices include rod shaped devices coupling the first end of the sleeve to the wall, forming an angle with the wall, wherein the angle is 90°.

In yet another example, a method for an engine comprises rotating a ring coupled to a turbine outlet cone responsive to desired exhaust gas temperature and flowrate, including adjusting a position of a plurality of swirl vanes coupled to the ring to vary a cross-sectional area of the turbine outlet cone, the swirl vanes distributed on an inner circumference of a wall of the turbine outlet cone, and the ring coupled to an outer circumference of the wall. In the preceding example, additionally or optionally, adjusting the position of the plurality of swirl vanes includes, during one or more of a lower than threshold exhaust flow rate and a lower than threshold exhaust temperature, actuating the plurality of swirl vanes to a closed position to cover a majority of the area of cross section and to channelize concentrated exhaust flow from a turbine outlet towards a portion of the exhaust aftertreatment device. In any or all of the preceding examples, additionally or optionally, adjusting the position of the plurality of swirl vanes further includes, during each of a higher than threshold exhaust flow rate and a higher than threshold exhaust temperature, opening the plurality of swirl vanes to a position based on each of the desired exhaust gas temperature and exhaust gas flow rate reaching the exhaust aftertreatment device to at least partly open the majority of the cross-sectional area and to route exhaust flow from the turbine outlet towards the exhaust aftertreatment device.

In this way, by utilizing adjustable swirl vanes within a turbine outlet cone, exhaust homogeneity and flow reaching a combined exhaust aftertreatment device may be improved. The vanes may be adjusted based on one or more of engine operating conditions, exhaust mass flow, and exhaust aftertreatment device temperature requirement such that exhaust temperature and flow reaching the exhaust aftertreatment device may be optimized. Based on demand, exhaust energy may be concentrated and channeled to provide localized heating of the exhaust aftertreatment device thereby expediting heating of e aftertreatment device. The technical effect of utilizing a conical shaped turbine outlet with adjustable vanes and an adjusting ring is that exhaust flow may be optimized while ensuring a close packing of the different components required for the desired flow. A homogeneous flow of exhaust within a short flow path may improve performance of the exhaust aftertreatment device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
via a controller, determining a cold-start condition, where the cold-start condition includes an engine temperature lower than an exhaust aftertreatment device light-off temperature, the engine temperature based on input received from one or more sensors coupled to the engine,
closing a plurality of vanes coupled to an exhaust turbine outlet cone via an actuator to concentrate exhaust flowing towards a portion of a catalyst of an exhaust aftertreatment device responsive to determining the cold-start condition, and
after attainment of exhaust aftertreatment device light-off temperature, adjusting an orientation of the plurality of vanes via the actuator to introduce turbulence and homogeneity to exhaust flow reaching the exhaust aftertreatment device.

2. The method of claim 1, wherein closing the plurality of vanes and adjusting the orientation of the plurality of vanes via the actuator includes the actuator adjusting a ring coupled to each vane of the plurality of vanes via a plurality of shafts and levers, wherein a shaft forms an axis about which a vane can rotate.

3. The method of claim 2, wherein the ring is coupled to an outer surface of a wall enclosing the turbine outlet cone via a mounting device, and where the actuator is coupled to the ring to adjust the ring.

4. The method of claim 1, wherein adjusting the orientation of the plurality of vanes is based on one or more of exhaust mass flow, exhaust temperature, and temperature demand of the exhaust aftertreatment device.

5. The method of claim 1, further comprising determining that an exhaust flow rate is less than a threshold exhaust flow rate, the exhaust flow rate based on estimated engine operating conditions and input received from one or more exhaust gas sensors, and closing the plurality of vanes to flow a concentrated exhaust mass towards the portion of the catalyst of the exhaust aftertreatment device while the exhaust flow rate is less than the threshold exhaust flow rate.

6. The method of claim 1, further comprising opening the plurality of vanes to a maximum possible degree based on a pressure loss between a turbine and the exhaust aftertreatment device that is greater than a threshold pressure loss, the pressure loss based on input from one or more exhaust gas sensors.

7. An engine system, comprising:
an exhaust gas passage for discharging exhaust gas;
a turbine coupled to the exhaust gas passage;
at least one combined exhaust gas aftertreatment system coupled to the exhaust gas passage downstream of the turbine;
a housing coupling the turbine to the exhaust gas aftertreatment system, wherein the housing includes an adjustable guide device forming an opening in a middle portion of the housing, the adjustable guide device comprising a plurality of guide vanes that can be rotated via an adjusting device arranged in the housing;
a plurality of sensors coupled to the engine system; and
a controller with computer readable instructions stored on non-transitory memory for:
adjusting the plurality of guide vanes via the adjusting device to vary a flow of exhaust from downstream of the turbine to an inlet of the exhaust gas aftertreatment system based on engine operating conditions, where the engine operating conditions are determined based on input data received from one or more of the plurality of sensors coupled to the engine system.

8. The system of claim 7, further comprising a wall enclosing the housing and the adjustable guide device while forming a gap between each guide vane of the plurality of guide vanes and the wall.

9. The system of claim 8, wherein each of the plurality of guide vanes is arranged on a guide vane shaft and rotatable about the guide vane shaft.

10. The system of claim 9, wherein each of the guide vane shafts is of rectilinear shape and forms an angle with the wall, wherein the angle is 90°.

11. The system of claim 7, wherein the adjusting device comprises a rotatable adjusting ring for adjusting an orientation of the plurality of guide vanes via rotation of the adjusting ring, and an actuator for adjusting the rotation of the adjusting ring based on input from the controller.

12. The system of claim 11, wherein the rotatable adjusting ring is kinematically coupled to each of the guide vane shafts via a plurality of pivotable levers.

13. The system of claim 12, wherein each of the plurality of pivotable levers is respectively connected at a first end, on a shaft side, and in a rotationally conjoint manner to a guide vane shaft, and
wherein each of the plurality of pivotable levers is mounted at a second end, opposite the first end, on a ring side, and movably in a recess of the adjusting ring, the plurality of pivotable levers enabling adjustments to the orientation of the guide vanes via rotation of the adjusting ring.

14. The system of claim 7, wherein the housing is one of a funnel-shaped form and a frustoconical form with a first end of the housing, proximal to the turbine, narrower than a second end of the housing, proximal to the exhaust gas aftertreatment system, the exhaust gas aftertreatment system including one or more of a NOx trap, an exhaust catalyst, and a particulate filter.

15. The system of claim 7, further comprising a sleeve arranged in the housing aligned coaxially in relation to the housing and passing through a central opening in the adjustable guide device, wherein the sleeve is one of a funnel-shaped form and a frustoconical form with a first end of the sleeve, proximal to the turbine, narrower than a second end of the sleeve, proximal to the exhaust gas aftertreatment system.

16. The system of claim 15, wherein the sleeve is coupled to a wall of the housing via a plurality of holding devices.

17. The system of claim 16, wherein the plurality of holding devices includes rod shaped devices coupling the first end of the sleeve to the wall, forming an angle with the wall, wherein the angle is 90°.

18. A method for an engine, comprising:
via a controller, rotating a ring coupled to a turbine outlet cone by adjusting an actuator responsive to a desired exhaust gas temperature and flowrate, where rotating the ring adjusts a position of a plurality of swirl vanes coupled to the ring to vary a cross-sectional area of the turbine outlet cone, the plurality of swirl vanes distributed on an inner circumference of a wall of the turbine outlet cone, and where the ring is coupled to an outer circumference of the wall, the desired exhaust gas temperature and flowrate based on engine operating conditions, and the engine operating conditions determined based on input data received from a plurality of sensors coupled to the engine.

19. The method of claim 18, wherein adjusting the position of the plurality of swirl vanes includes determining that an exhaust temperature is lower than a threshold exhaust temperature, and actuating the plurality of swirl vanes to a closed position to cover a majority of the cross-sectional area and to channelize concentrated exhaust flow from a turbine outlet towards a portion of an exhaust aftertreatment device responsive to determining that the exhaust temperature is lower than the threshold exhaust temperature, wherein the exhaust temperature is detected via an exhaust temperature sensor.

20. The method of claim 19, wherein adjusting the position of the plurality of swirl vanes further includes determining that the exhaust temperature is higher than the threshold exhaust temperature, and actuating the plurality of swirl vanes to an open position responsive to determining that the exhaust temperature is higher than the threshold exhaust temperature, a degree of opening of the open position based on the desired exhaust gas temperature reaching the exhaust aftertreatment device, where the degree of opening of the open position opens a majority of the cross-sectional area and routes exhaust flow from the turbine outlet towards the exhaust aftertreatment device.

* * * * *